F. BUTLER.
LEVEL HOLDER.
APPLICATION FILED AUG. 28, 1920.
1,388,023.
Patented Aug. 16, 1921.
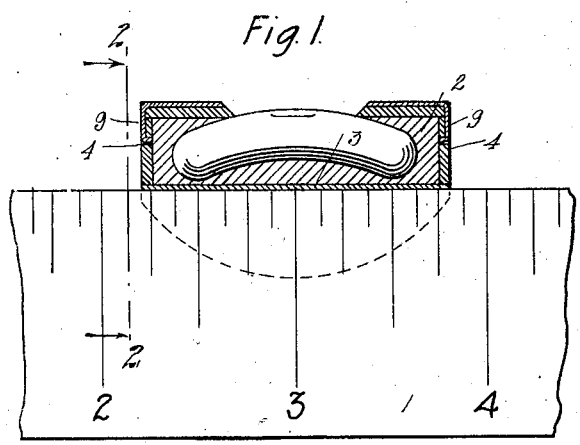
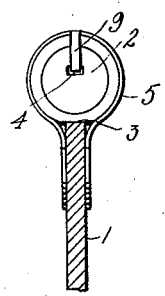
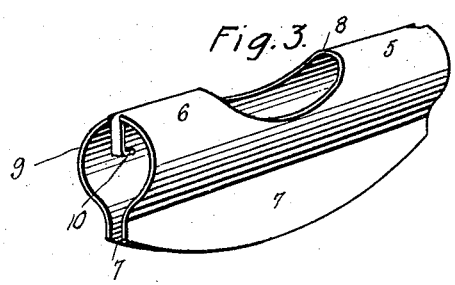
WITNESSES
INVENTOR
Frank Butler
BY
ATTORNEYS

UNITED STATES PATENT OFFICE.

FRANK BUTLER, OF LOS ANGELES, CALIFORNIA.

LEVEL-HOLDER.

1,388,023.                   Specification of Letters Patent.     Patented Aug. 16, 1921.

Application filed August 28, 1920. Serial No. 406,552.

*To all whom it may concern:*

Be it known that I, FRANK BUTLER, a citizen of the United States, and a resident of Los Angeles, in the county of Los Angeles and State of California, have invented a new and Improved Level-Holder, of which the following is a full, clear, and exact description.

This invention relates to improvements in level holders, an object of the invention being to provide a holder which will receive the ordinary type of pocket spirit level and support the same against a straight edge so that the level can be used on an extended surface.

A further object is to provide a level holder which can be manufactured and sold at an extremely low price, which can be quickly placed in position on an ordinary type of spirit level, and which will grip the spirit level and also the strip or gage on which it is located to hold the spirit level in operative position.

With these and other objects in view the invention consists in certain novel features of construction, and combinations and arrangements of parts, as will be more fully hereinafter described and pointed out in the claims.

In the accompanying drawings—

Figure 1 is a view in longitudinal section illustrating my improved device supporting a spirit level on the edge of a rule or straight edge.

Fig. 2 is a view in tranverse section on the line 2—2 of Fig. 1.

Fig. 3 is a perspective view of my improved level holder.

1 represents a straight edge which may constitute a portion of a rule, a square, an angle, or an ordinary strip of wood or metal having an extended straight edge or surface which may be used in connection with a spirit level.

2 represents an ordinary spirit level of the type known on the market as the vest pocket spirit level because of its size and convenience in carrying. This spirit level is of general cylindrical form having a flat surface 3 and is provided with sockets or recesses 4 in its end, said sockets or recesses being preferably of angular formation.

5 represents my improved holder which comprises a spirit clamp having a cylindrical portion 6 and a pair of clamping wings 7. The cylindrical portion 6 is adapted to receive the level 2 and is provided with an extended opening 8 in its upper portion to expose the spirit level. Integral tongues 9 are formed on the ends of the holder and project downwardly at right angles thereto and are provided with inwardly projecting lugs 10 at their free ends which are projected into the sockets or recesses 4 in the ends of the spirit level to hold the latter against turning or longitudinal movement in the holder. These tongues 9 may be of sufficient elasticity to prevent their accidental displacement or they may be of some bendable material which can be conveniently shaped. As a matter of fact, the holder is of spring sheet metal having sufficient elasticity to clamp itself in place, and the wings 7, 7, will securely clamp the sides of the strip or straight edge 1 and hold the spirit level properly positioned thereon.

The holder is preferably stamped from a single blank and bent into shape, and hence can be manufactured at an extremely low price and will, by employing the ordinary form of pocket level, permit a wide range of utility and convenience in determining levels.

Various slight changes might be made in the general form and arrangement of parts described without departing from the invention, and hence I do not limit myself to the precise details set forth, but consider myself at liberty to make such changes and alterations as fairly fall within the spirit and scope of the appended claims.

I claim:

1. A level holder, comprising a cylindrical portion having wings thereon and adapted to clamp a support, and downwardly and inwardly projecting tongues on the ends of the cylindrical portion adapted to engage in recesses in the ends of a spirit level and hold the latter against turning movement in the cylindrical portion.

2. A level holder, comprising a cylindrical portion having wings thereon spaced apart and adapted to clamp a support, a spirit level located in the cylindrical portion and having sockets or recesses in its ends, and downwardly and inwardly projecting tongues on the ends of the cylindrical portion positioned in said sockets or recesses and holding the level against rotary or longitudinal movement.

FRANK BUTLER.